(12) United States Patent
Cox

(10) Patent No.: US 10,992,119 B1
(45) Date of Patent: Apr. 27, 2021

(54) ELECTRIC SPINNING PLIERS

(71) Applicant: Kevin Cox, Washington, UT (US)

(72) Inventor: Kevin Cox, Washington, UT (US)

( * ) Notice: Subject to any disclaimer, the term of this patent is extended or adjusted under 35 U.S.C. 154(b) by 0 days.

(21) Appl. No.: 17/060,843

(22) Filed: Oct. 1, 2020

Related U.S. Application Data

(60) Provisional application No. 62/984,502, filed on Mar. 3, 2020.

(51) Int. Cl.
```
H02G 1/14      (2006.01)
B25F 3/00      (2006.01)
H02G 1/12      (2006.01)
B25F 5/02      (2006.01)
H01R 43/28     (2006.01)
H01R 4/12      (2006.01)
```
(52) U.S. Cl.
CPC ............... *H02G 1/14* (2013.01); *B25F 3/00* (2013.01); *B25F 5/02* (2013.01); *H01R 4/12* (2013.01); *H01R 43/28* (2013.01); *H02G 1/1234* (2013.01)

(58) Field of Classification Search
CPC .... H02G 1/1204; H02G 1/1234; B21F 15/04; B21F 7/00; B21F 1/00; B21F 1/003; B21F 3/00; B21F 5/00; B21F 5/02; B21F 5/021; B25B 7/00; B25B 7/12; B25B 7/22
See application file for complete search history.

(56) References Cited

U.S. PATENT DOCUMENTS

| | | | | |
|---|---|---|---|---|
| 2,394,807 A | * | 2/1946 | Robinson ................ | B25F 1/00 7/130 |
| 3,092,152 A | * | 6/1963 | Neff ....................... | B21F 15/04 140/119 |
| 4,331,183 A | * | 5/1982 | Calhoun .................. | B21F 1/06 140/106 |
| 7,946,314 B1 | * | 5/2011 | Perone .................... | B21F 7/00 140/119 |

* cited by examiner

*Primary Examiner* — Tyrone V Hall, Jr.
(74) *Attorney, Agent, or Firm* — Gurr Brande & Spendlove, PLLC; Robert A. Gurr; Brian D. Batt

(57) ABSTRACT

An electric spinning pliers apparatus includes a housing, a plier head coupled to a rotatable shaft, and a head-operating handle. The housing may have a wire sleeve stripper, an iris door, one or more controls, and an indicator light. The electric spinning pliers apparatus utilizes the wire sleeve stripper to cut an outer sleeve of a group of wires, exposing individual wires. Each individual wire may be stripped by the iris door, while the plier head may grasp and rotate, via a motor, each of the individual wires into a single unit. The plier head may then twist a wire nut on the twisted wires.

19 Claims, 9 Drawing Sheets

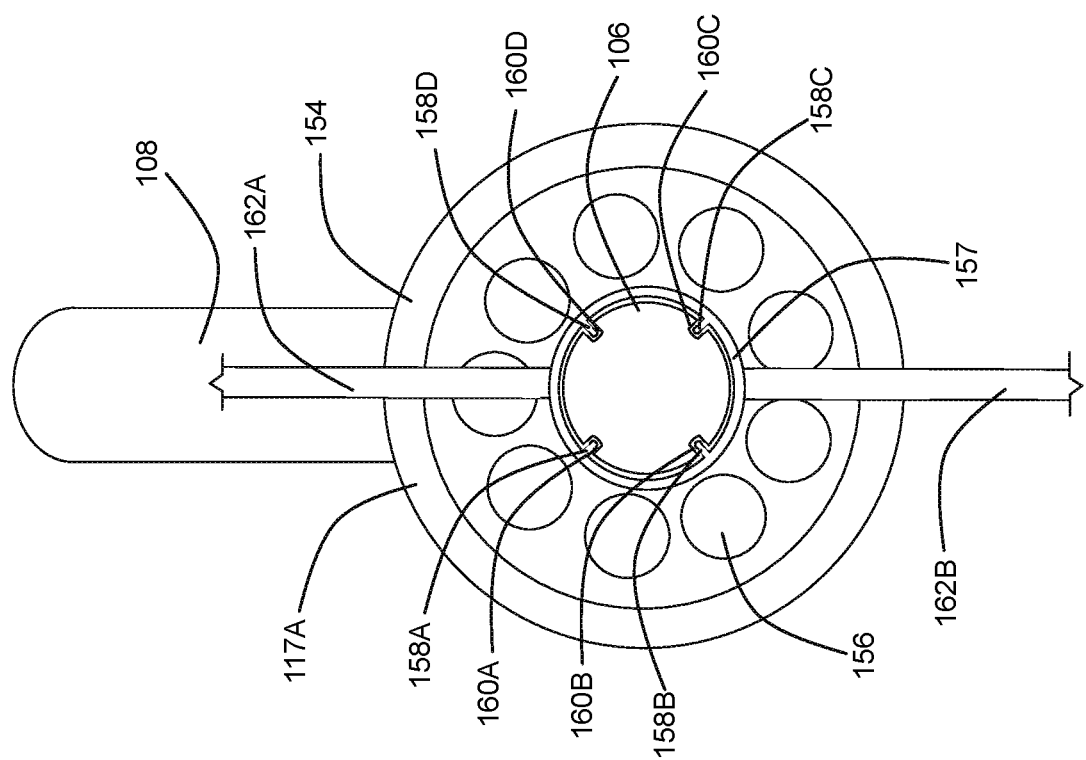

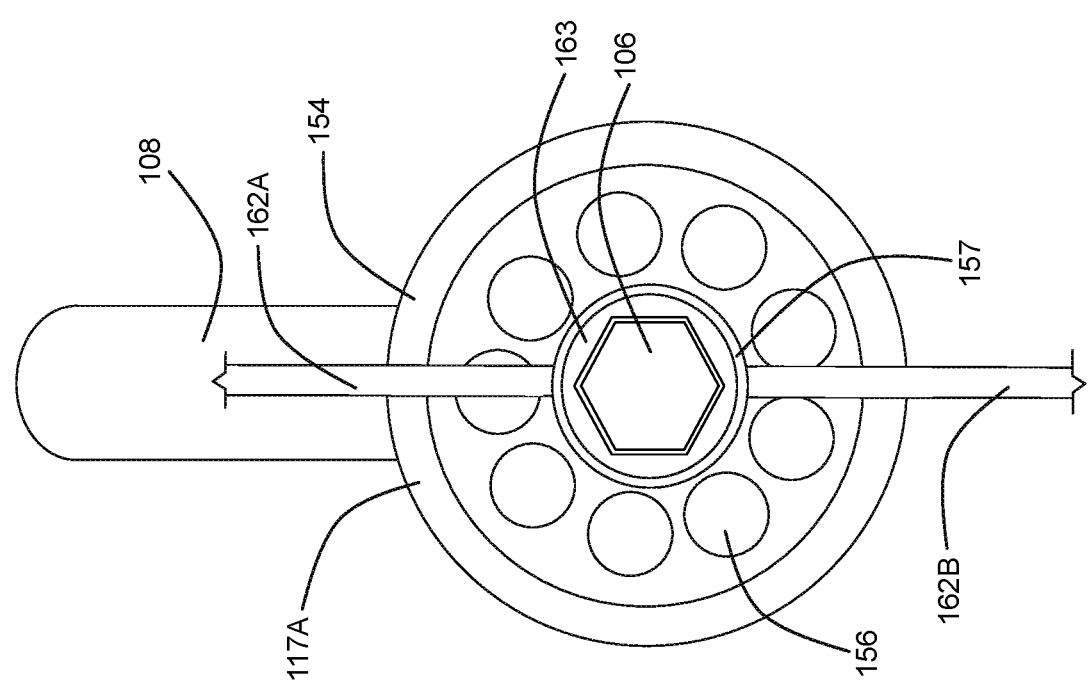

ELECTRIC SPINNING PLIERS

CROSS-REFERENCE TO RELATED APPLICATIONS

This application claims the benefit of U.S. Provisional Application Ser. No. 62/984,502, filed on Mar. 3, 2020, which is incorporated herein by reference.

TECHNICAL FIELD

The present disclosure relates to pliers. More particularly, the present disclosure relates to electric spinning pliers that strip and twist electrical wires, without exertion from a user.

BACKGROUND

In the construction industry, there are many individuals that still use conventional pliers or their hands to perform certain tasks. For example, many still use conventional pliers or their hands to twist standard wires for rebar, electrical wires, wire nuts, and for removing wire sleeves. Using conventional pliers or hands to twist wires every day for years can take a toll on a user's wrists. In fact, the repetitive and constant motion of using pliers or hands to twist wires can cause severe arthritis, tendinitis, carpal tunnel, and, in some cases, early retirement due to loss of physical ability to perform the job. Even with this knowledge, electricians and other construction workers still use these rudimentary tools to complete their tasks as there is no suitable alternative.

Further, electricians and other construction workers use a number of tools to complete a task. Some of these tools may be pliers, wire strippers, cordless drills, screw guns, a razor blade utility knife, etc. Electricians may be burdened by carrying numerous tools every day. While the repetitive wire twisting motion may cause damage to wrists, carrying too many tools can become taxing on an electrician's back and joints. In addition, electricians must keep track of each of these tools every day and at every worksite, which may become difficult with the number of tools that an electrician uses. Without each of these tools, an electrician would be severely hindered in successfully and efficiently completing a job.

Accordingly, there remains a need for an all-in-one device that strips and twist wires, is compact and easy to carry, replaces the many tools used by electricians, and helps reduce wrist injury. The present disclosure seeks to solve these and other problems.

SUMMARY OF EXAMPLE EMBODIMENTS

In one embodiment, electric spinning pliers comprise a housing, a plier head coupled to a rotatable shaft the extends from the housing, and a head-operating handle. The housing may comprise a wire sleeve stripper, an iris door, one or more controls, and an indicator light. The housing may further comprise internal components, such as a motor, bearings, and an internal battery, to rotate the plier head. The electric spinning pliers apparatus utilizes the wire sleeve stripper to cut an outer sleeve of a group of wires, exposing individual wires. Each individual wire may be stripped by the iris door, while the plier head may grasp and rotate, via the motor, each of the individual wires into a single unit. The plier head may then twist a wire nut on the twisted wires.

In one embodiment, the electric spinning pliers are stored in a storage case. Specifically, the storage case may comprise a power plug and a battery charger. Once the storage case is plugged into a power socket, and with the electric spinning pliers positioned therein, the battery charger may begin to charge the internal battery of the electric spinning apparatus via, for example, wireless charging. More specifically, the battery charger may comprise a transmission coil that creates an electromagnetic field. The housing may comprise a receiver coil to receive and convert the energy from the electromagnetic field into workable electricity that may be supplied to the internal battery. Alternatively, the storage case may have a charging port that mates with a charging port on the electric spinning pliers. Additionally, the storage case may have a built-in battery, charging the electric spinning pliers without being plugged in, which extends the use of the electric spinning pliers.

In one embodiment, a method of using the electric spinning pliers comprises stripping the outer wire cover, using the iris door stripper to strip individual wires, grip the wires to be connected with the plier head, press forward button to spin the plier head, thereby twisting the wires together. Then, a user may also use the plier head to apply a wire nut in the same manner with the forward button. A user may also insert a hex bit to screw a face plate covering onto the outlet. Lastly, the electric spinning pliers may be returned to the storage case where it will continue to charge from the built-in battery.

In one embodiment, the plier head may comprise needle nose pliers, which may be beneficial in other industries, such as jewelry making.

BRIEF DESCRIPTION OF THE DRAWINGS

FIG. 6A illustrates a front elevation view of a first bearing with a rotatable shaft positioned therein;

FIG. 6B illustrates a front elevation view of a first bearing having an inner hex ring with a rotatable shaft positioned therein;

DETAILED DESCRIPTION OF EXAMPLE EMBODIMENTS

Figure 1:
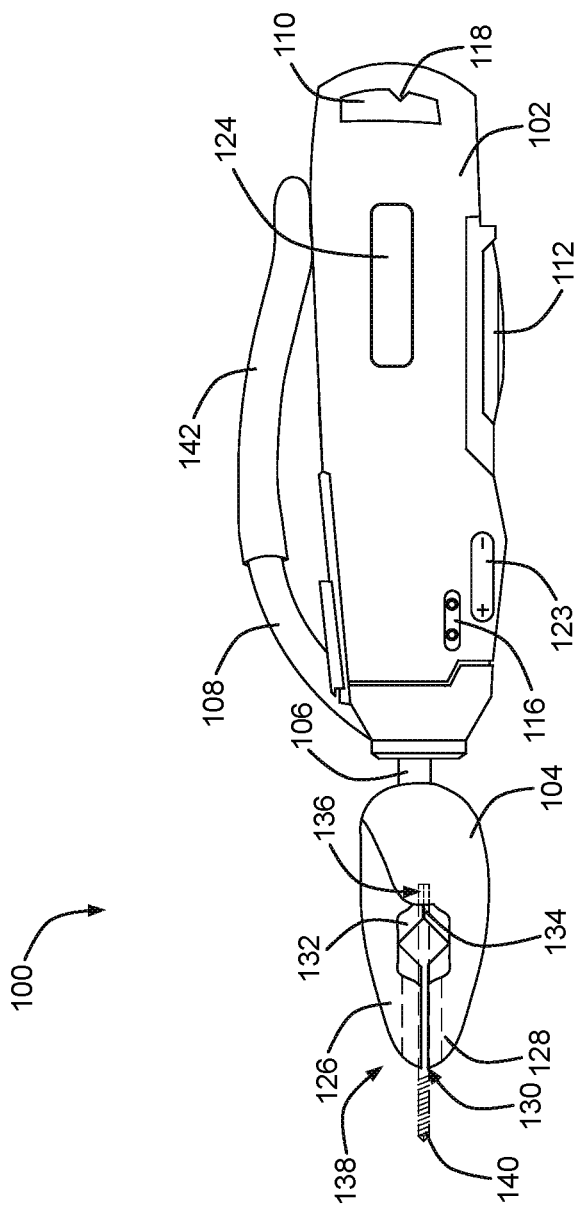
FIG. 1 illustrates a side elevation view of electric spinning pliers.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there remains a need for an all-in-one device that strips and twist wires, is compact and easy to carry, replaces the many tools used by electricians, and helps reduce wrist injury. The present disclosure seeks to solve these and other problems.

Electricians and other construction workers utilize many tools to complete a task. Often, electricians have health issues because of the many tools that must be used. In particular, many of the tools that are used demand an electrician to repeat the same motion day after day. For example, electricians strip and twist wires constantly. This repetitive motion with hands and pliers has caused tendonitis and carpal tunnel in many electricians. The tools used for wiring buildings or homes have not improved for many years. In fact, to twist wires, many electricians will grab the wires with regular pliers and twist until it is small enough to place a wire nut thereon.

In contrast, the electric spinning pliers described herein, generally, comprise a housing with a motor, a rotatable shaft, an iris door, a wire sleeve stripper, and a handle to operate a rotatable plier head. To use the electric spinning pliers, a user cuts an outer sleeve with the wire sleeve stripper, exposing a group of wire. Each individual wire may be automatically stripped via the iris door. After the wires are twisted into a single unit, the user may grasp a wire nut with the plier head and rotate the plier head until the wire nut is secured. It will be appreciated that the electric spinning pliers automate a majority of an electrician's job, thereby preventing risk of tendonitis or carpal tunnel, promoting efficiency, and decreasing the number of tools an electrician needs to carry.

In one embodiment, as shown in FIG. 1, an electric spinning pliers apparatus 100 comprises a housing 102, a plier head 104 coupled to a rotatable shaft 106, and a head-operating handle 108. The head-operating handle 108 is operably coupled to the plier head 104 so as to control the opening/closing of the plier head 104, yet not rotate when the plier head 104 rotates. This may be accomplished by using one or more bearings coupled to the rotatable shaft 106 or other suitable mechanism. The housing 102 may comprise a wire sleeve stripper 110, an iris door 112, one or more controls, and an indicator light 116. The housing 102 may further comprise internal components, such as a motor, bearings, and an internal battery, to rotate the plier head 104 and actuate the iris door 112.

The housing 102 may me manufactured from a plastic material. However, it could be envisioned that any type of material may be used, such as carbon fiber, aluminum, steel, etc. The housing 102 may be compact, large, or any other size. As an example, a compact housing may be used by a user working on small electronics, such as toy cars and planes, that does not need a robust electric spinning apparatus. In contrast, an electrician may need a larger housing that has additional features and enough structural integrity to handle the rigors of their job. The housing 102 may be any shape, such as cylindrical or shaped like a drill gun.

The wire sleeve stripper 110 may be recessed in the housing and comprise a razor blade 118 therein so as to prevent accidents. Alternatively, in one embodiment, the wire sleeve stripper 110 may comprise a housing with a razor blade positioned therein and coupleable to an outer surface of the housing. For example, the wire stripper 110 may be a conically shaped housing, or any other shape, that is removably attachable to the housing on an end opposite the plier head 104. It will be appreciated that the razor blade may be removably attachable from the wire sleeve stripper so as to replace dull blades with sharp blades. In some embodiments, the wire sleeve stripper may comprise a single blade that is pivotally coupleable to the housing that may be folded into a safe position on the housing and extended into a wire cutting position. In some embodiments, the wire sleeve stripper comprises a single blade that is positioned within the housing and may be automatically or manually extended from the housing and retracted into the housing via a button, lever, or other actuating mechanism. To use the wire sleeve stripper 110, a user inserts a group of wires with a wire sleeve therein. As the user pulls the housing back toward their body and away from the end of the wire sleeve, the blade 118 cuts the sleeve and exposes each individual wire.

Figure 3:
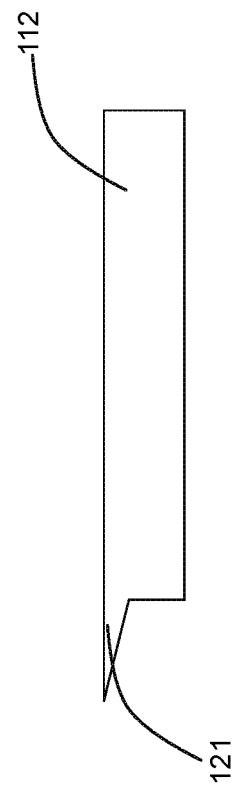
FIG. 3 illustrates a side elevation view of an iris door of electric spinning pliers.
Figure 2:
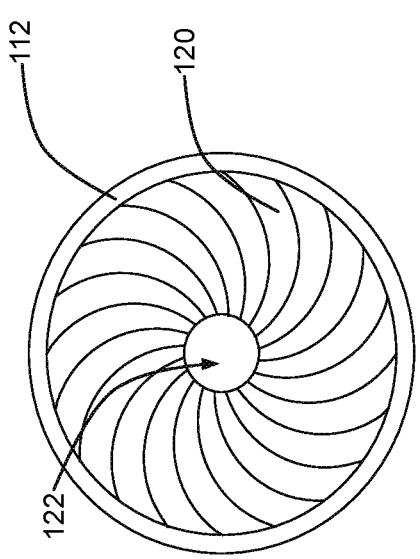
FIG. 2 illustrates a bottom plan view of an iris door of electric spinning pliers.
Figure 4:
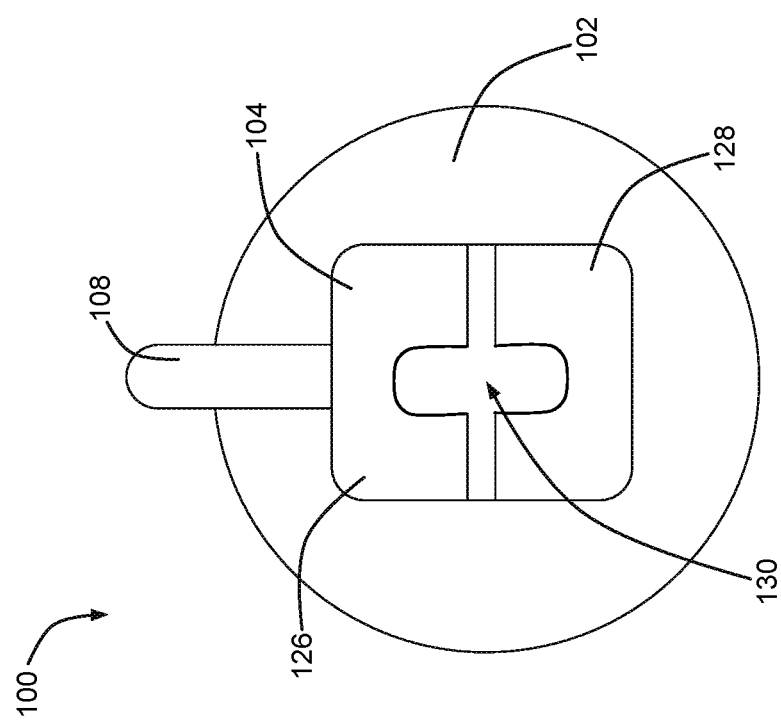
FIG. 4 illustrates a front elevation view of electric spinning pliers.

Each individual wire may then be stripped by the iris door 112 to expose the wire. As shown in FIG. 2, the iris door 112 comprises leaves 120 (e.g., blades) that form a circle that may open and close, which increases and decreases the size of an iris aperture 122. For example, as the blades 120 move towards each other and the center of the diameter, the iris aperture 122 decreases. As shown in FIG. 3, the iris door 112 may comprise an actuating arm 121 that allows the leaves 120 to open and close. The iris door 112 may be activated to open and close by a push button, lever, switch, etc. After the user activates the iris door 112, an individual wire may be inserted therein. Accordingly, as the iris door 112 closes, the leaves 120 cut through the wire sleeve. Then the iris door 112 moves up (i.e., into the housing) pulling the sleeve from the wire. Once the sleeve is off of the wire, the iris door 112 opens, releasing the removed sleeve and the wire, and moving to the down position (i.e., lowered position) to repeat the above described process. In one embodiment, the iris door 112 may be activated by a motion sensor. In other words, when a user begins to insert the individual wire, the iris door 112 may be activated, cutting through the wire sleeve. It will be appreciated that the iris door 112 may come in a variety of diameters. It will further be appreciated that the leaves 120 may vary in thickness so as to cut through various thicknesses of wire sleeves and not lose structural integrity.

Referring back to FIG. 1, the housing 102 may comprise the one or more controls, which may include a forward/reverse button 123 and a trigger button 124. The forward/reverse button 123 allows the plier head 104 to rotate in two directions, clockwise or counterclockwise. While the forward/reverse is shown as a button, it may also be a switch, lever, dial switch, etc. It will be appreciated that, in one embodiment, the forward/reverse button 123 and trigger button are the same. For example, pressing a front of the trigger button may rotate the plier head in a clockwise rotation/forward rotation, while pressing a back of the trigger button may rotate the plier head in a counterclockwise rotation/reverse rotation. Similar to a screw gun or drill, the trigger button 124 may activate the electric spinning pliers 100. In particular, the trigger 124 activates rotation of the plier head 104. For example, as a user increases pressure on the trigger button 124, the rotational speed of the plier head 104 increases. Inversely, as the user decreases pressure on the trigger button 124, the rotational speed of the head 104 decreases. It will also be appreciated that, in some embodiments, the one or more controls may further comprise a torque switch to control the rotational force of the plier head 104.

The housing 102 may also comprise an indicator light 116 that notifies a user of the battery power lever. The indicator light 116 may comprise a plurality of lights to indicate battery strength. For example, in some embodiments, the indicator light 116 may comprise three lights with different colors, such as green, yellow, and red. When the battery is fully-charged, the green light may by illuminated. As the battery loses power, the yellow light may be illuminated. Lastly, when the battery is approaching a complete loss of power, the red light may be illuminated.

Positioned within the housing 102 is an internal battery, motor, a first bearing 117A and, optionally, a second bearing 117B, and the rotatable shaft 106. The internal battery may be charged via wireless charging, as will be described below. However, the internal battery may, in one embodiment, be charged through a charging port. Additionally, in one embodiment, the internal battery may be removably attachable so as to be placed in a charging dock, similar to batteries that are removably attachable on drills found in the prior art.

The motor and the bearings may be coupled to the rotatable shaft 106 so as to rotate the rotatable shaft 106 and decrease friction on the internal components. The rotatable shaft 106 may extend longitudinally through the entire housing 102 and exit the housing 102 where it is coupled to the plier head 104. The rotatable shaft 106 may vary in diameter, and in some embodiments, length, depending on the end use of the electric spinning pliers 100 and to prevent the rotatable shaft 106 from bending or breaking. In other words, as a user cuts or twist certain gauges of wire, the rotatable shaft 106 must withstand the stress placed thereon, which may vary depending on whether the user is an electrician or an individual that works on small electronics. Further, in one embodiment, a torque converter may be coupled to the rotatable shaft 106 and the motor.

Further, the plier head 104 may comprise a first arm 126 and a second arm 128, a wire receiving aperture 130, pipe grips 132, a cutter/crimper 134, and a bit aperture 136 (e.g., a hex bit aperture). The first and second arms 126, 128 may be pivotally coupled. The wire receiving aperture 130 may be a u-shaped (i.e., ovular shaped when the first and second arms 126, 128 are closed) opening on a front portion 138 of the first and second arms 126, 128 of the plier head 104 to receive one or more wires and a wire nut. To twist wires, a user inserts the wires into the wire receiving portion to be securely held therein. As the head 104 rotates, the wires are twisted into a single unit. While the wire receiving aperture 130 as shown is u-shaped, it will be appreciated that the wire receiving aperture 130 may comprise many shapes, such as triangular. The pipe grips 132 may allow a user to grasp numerous items, such as pipes, bolts, nuts, to loosen or tighten. The cutter/crimper 134 may cut wire to a desired length.

In addition, the plier head 104 comprises the bit aperture 136 to receive a variety of hex bits, such as flat head bits, phillips bits, etc. When the first and second arms 126, 128 are in an opened position, a user may insert a hex bit into the hex bit aperture 136, which is located at a base of the opened arms 126, 128. The hex bit aperture 136 may secure hex bits via tension. In an alternate embodiment, the hex bit aperture 136 may secure hex bits via tension and a magnet that is positioned inside the hex bit aperture 136. Accordingly, the electric spinning pliers apparatus 100 may act as a screw gun or drill when a hex bit is inserted therein. For example, a user may place a flathead screwdriver hex bit into the hex bit aperture 136 in order to remove screws 140 on a faceplate of an electrical box. In an alternate embodiment, the wire receiving aperture 130 is hex shape so as to receive a hex bit therethrough, thereby maintaining the first and second arms 126, 128 in a closed position.

While the plier head 104 shown is a linesman's plier head, it will be appreciated that other types of plier heads may be used, such as needle nosed, cutting, or any other type of plier head. Many individuals may use the electric spinning pliers 100. For example, a jewelry maker, who constantly twists and bends wire may benefit greatly from the electric pliers 100. As an example, a jewelry maker may benefit from electric pliers 100 with the needle nose plier head. Further, a heavy-duty model can be used in a concrete or construction setting to tie rebar. In one embodiment, the plier head 104 may be removably attachable so as to allow different types of plier heads to be coupled to a single housing.

Figure 5:
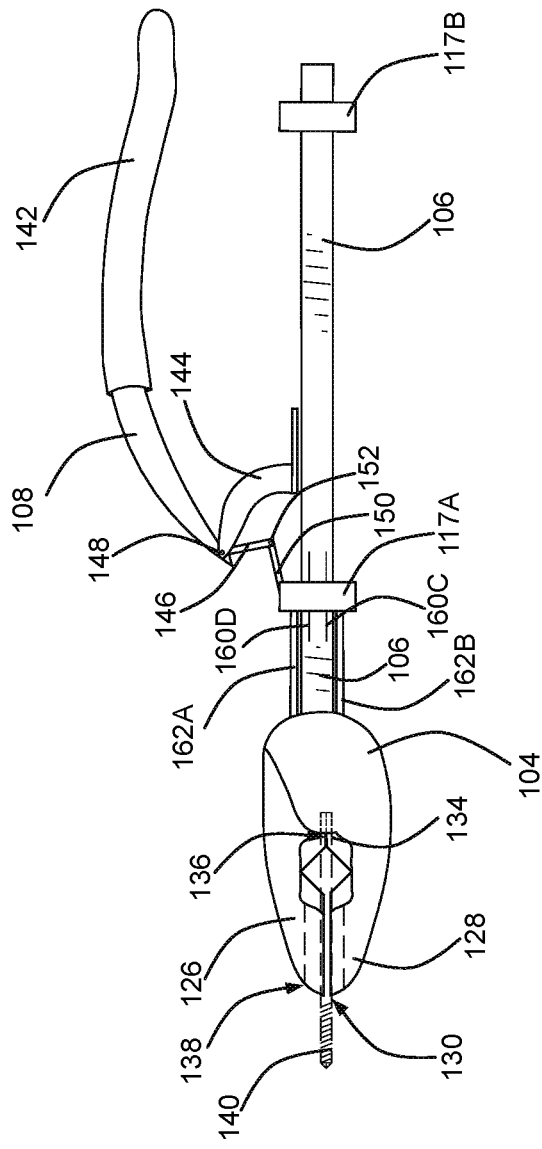
FIG. 5 illustrates a side elevation view of a head-operating handle and a rotatable shaft of electric spinning pliers.

As shown in FIG. 5, the head-operating handle 108 may comprise a grip material 142, such as silicone, rubber, leather, or any other material to enhance connection between the handle 108 and the user's hand. The head-operating handle 108 may be pivotally coupled to a securement arm 144 and a first support 146 via a first pin 148. The securement arm 144 provides a place of securement for the head-operating handle 108 so as to be coupled to the housing 102 (not shown in this view). The first support 146 may then be pivotally coupled to a second support 150 via a second pin 152. The second support 150 is then coupled to a slidable ring 154 (i.e., an outer ring) of the first bearing 117A. The second support 150 may be coupled to the slidable ring 154 via welds or any other attachment mechanism.

As best seen in FIG. 6A, in one embodiment, the first bearing 117A comprises the outer, slidable ring 154, ball bearings 156, and an inner, rotatable ring 157 that engages the shaft 106 via protrusions 158A-158D. In other words, the protrusions 158A-158D mate with channels 160A-160D, respectively, allowing the rotatable ring 157 to slide longitudinally on the shaft 106, while also ensuring rotation of the inner ring 157 when the shaft 106 rotates. Because the rotatable ring 157 and slidable ring 154 are coupled to each other via ball bearings 156, the rotatable ring 157 rotates axially and the outer, slidable ring 154 remains stationary. A first actuating arm 162A and a second actuating arm 162B are coupled to the first bearing 117A via the rotatable ring 157. As the first and second actuating arms 162A-162B extend towards the plier head 104, they force the first arm 126 and second arm 128 to pivot outwardly and open.

For example, to open the plier head 104, a user lifts the head-operating handle 108, causing the first and second supports 146, 150 to extend. When the first and second supports 146, 150 extend, the rotatable ring 157 slides on the shaft 106 with the protrusions 158A-158D sliding in the longitudinal channels 160A-160D towards the plier head 104 (it will be appreciated that to enhance slidability, greases or additional ball bearings may be used between the rotatable ring 157 and the shaft 106). As the first bearing 117A is slid longitudinally towards the plier head 104, the first and second actuating arms 162A-162B move latitudinally (i.e., away from the rotational shaft 106), thereby opening the first and second arms 126, 128. Accordingly, the head-operating handle 108 may open both the first and the second arms 126, 128 at the same time. Alternatively, in one embodiment, the second arm 128 may be stationary while the first arm 126 opens when the user lifts the head-operating handle 108 (as discussed in other embodiments herein). Further, the first and second arms 126, 128, in one embodiment, may open automatically without the aid of a mechanical handle. For example, a motor-driven linear actuator may be used, allowing a user to press a button to open/close the plier head 104. As described below, in one embodiment, multiple bearings may be used without the need of protrusions 158A-158D or longitudinal channels 160A-160D.

Once the first and second arms 126, 128 are in an opened position, a group of stripped wires may be placed in the wire receiving aperture 130. After the wires are in the wire receiving aperture 130 and the first and second arms 126, 128 are in a closed position, the user may then depress the trigger button 124, rotating the rotatable shaft 106. The protrusions 158A-158D allow the rotatable ring 157, via protrusions 158A-158D, to engage the longitudinal channels 160A-160D so as to rotate the first and second supports 162A, 162B and ultimately, the plier head 104. While the plier head 104 rotates, it will be appreciated that the slidable ring 154 allows the head-operating handle 108 to remain in a single position without rotating. Further, the second bearing 117B is positioned at an opposite end of the rotatable shaft 106 so as to add strength to the rotatable shaft 106 while twisting and prying on wires.

In an alternate embodiment, as shown in FIG. 6B, the inner ring 157 may be coupled to a hex ring 163. Further, the hex ring 163 may receive the rotatable shaft 106, which may have a hexagonal shape so as to mate with the hex ring 163. Similar to previous embodiments described herein, once the trigger button 124 is depressed, the shaft 106 engages the hex ring 163, thereby rotating the inner ring 157 and thus, the plier head 104. It will be appreciated that the hex ring 163 is slidable on the shaft 106, and additional ball bearings, grease, or similar items may be used to enhance the slidability of the hex ring 163 on the shaft 106. It will further be appreciated that the first bearing 117A and associated components may be internal, or external to the housing 102. For example, the components are within the housing in FIG. 1 and are external to the housing in FIGS. 8-9.

A typical electrician has to carry numerous tools to perform a given task. For example, an electrician usually carries a screwdriver, pliers, utility knife, wire strippers, and other tools. It will be appreciated that the electric spinning pliers apparatus 100 combines numerous tools into one device, which alleviates the burden of carry numerous tools all day long as well as removes the stress of misplacing an essential tool.

Figure 7:
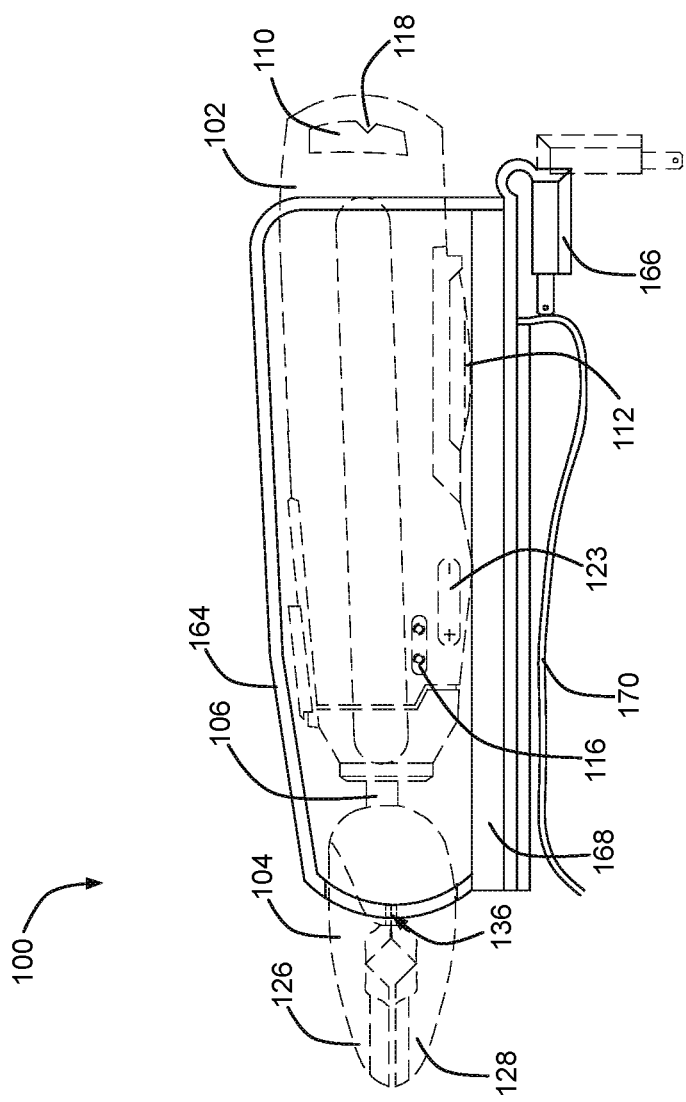
FIG. 7 illustrates a side elevation view of a storage case with electric spinning pliers positioned therein.

In one embodiment, as shown in FIG. 7, the electric spinning pliers 100 are stored in a storage case/holster 164. The storage case 164 may comprise a nylon, Kydex™, leather, or any other type of material. It will be appreciated that the storage case 164 may not only store, but also charge the electric spinning pliers 100. Specifically, the storage case 164 may comprise a power plug 166 and a battery charger 168. Once the storage case 164 is plugged into a power socket and with the electric spinning pliers 100 positioned therein, the battery charger 168 may begin to charge the internal battery of the electric spinning apparatus 100 via, for example, wireless charging. More specifically, the battery charger 168 may comprise a transmission coil that creates an electromagnetic field. The housing 102 may comprise a receiver coil to receive and convert the energy from the electromagnetic field into workable electricity that may be supplied to the internal battery. Additionally, the battery charger 168 may comprise a battery, allowing the battery charger 168 to charge the electric spinning pliers 100 even when not plugged in. The storage case 164 may further comprise a belt clip 170, which may attach to a user. The belt clip 170 may be a metal or plastic clip. Alternatively, the belt clip 170 may be a nylon webbing that creates a loop.

In one embodiment, a method of using the electric spinning pliers apparatus 100 comprises placing a group of wires with an outer sleeve into a wire sleeve stripper 110 and cutting the outer sleeve. After the individual wires are exposed when the outer wire sleeve is removed, the user places each wire into the iris door 112 for individual wire stripping. The user then grasps the stripped wires by operating a head-operating handle 108 with a plier head 104 in a wire receiving aperture 130 and rotates the head 104 by pressing the trigger button 124. Once the wires are twisted into a single unit, the user places a wire nut into the wire receiving aperture 130 and screws it onto the single unit of twisted wires.

Figure 8:
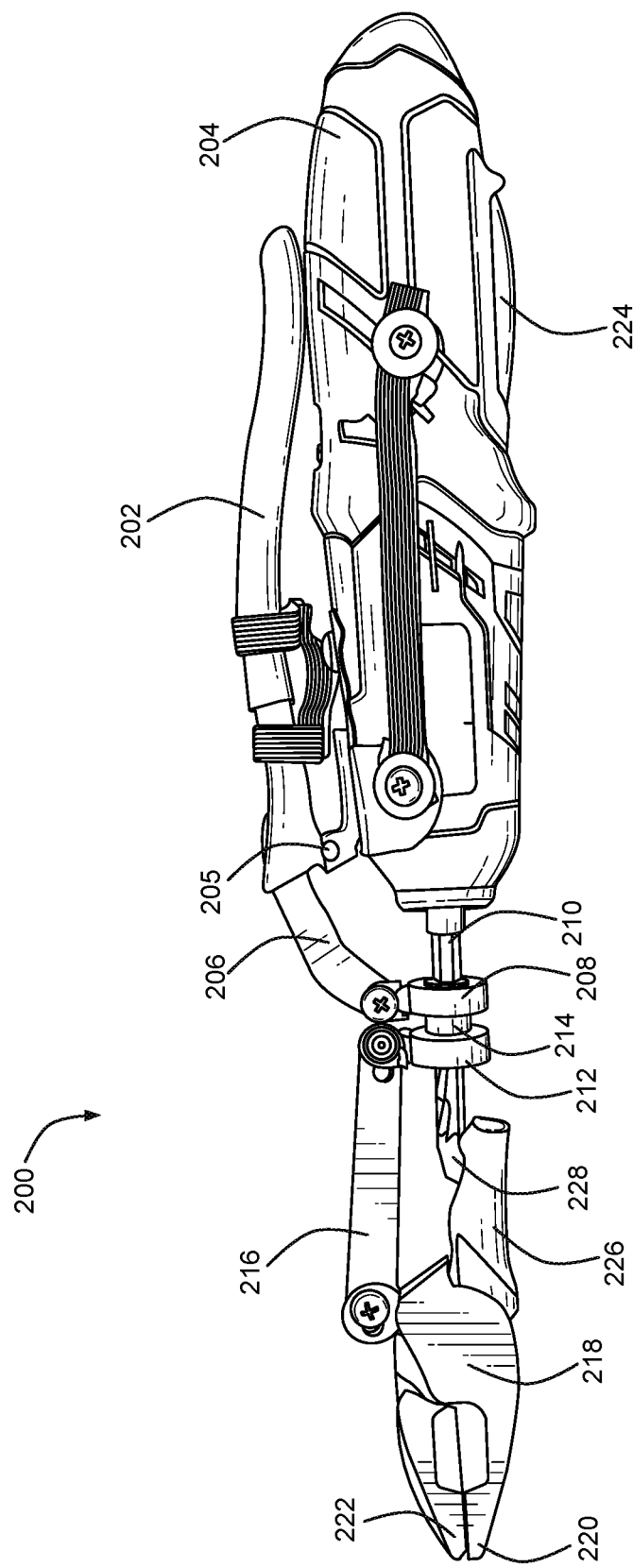
FIG. 8 illustrates a side elevation with of electric spinning pliers in a closed position.
Figure 9:
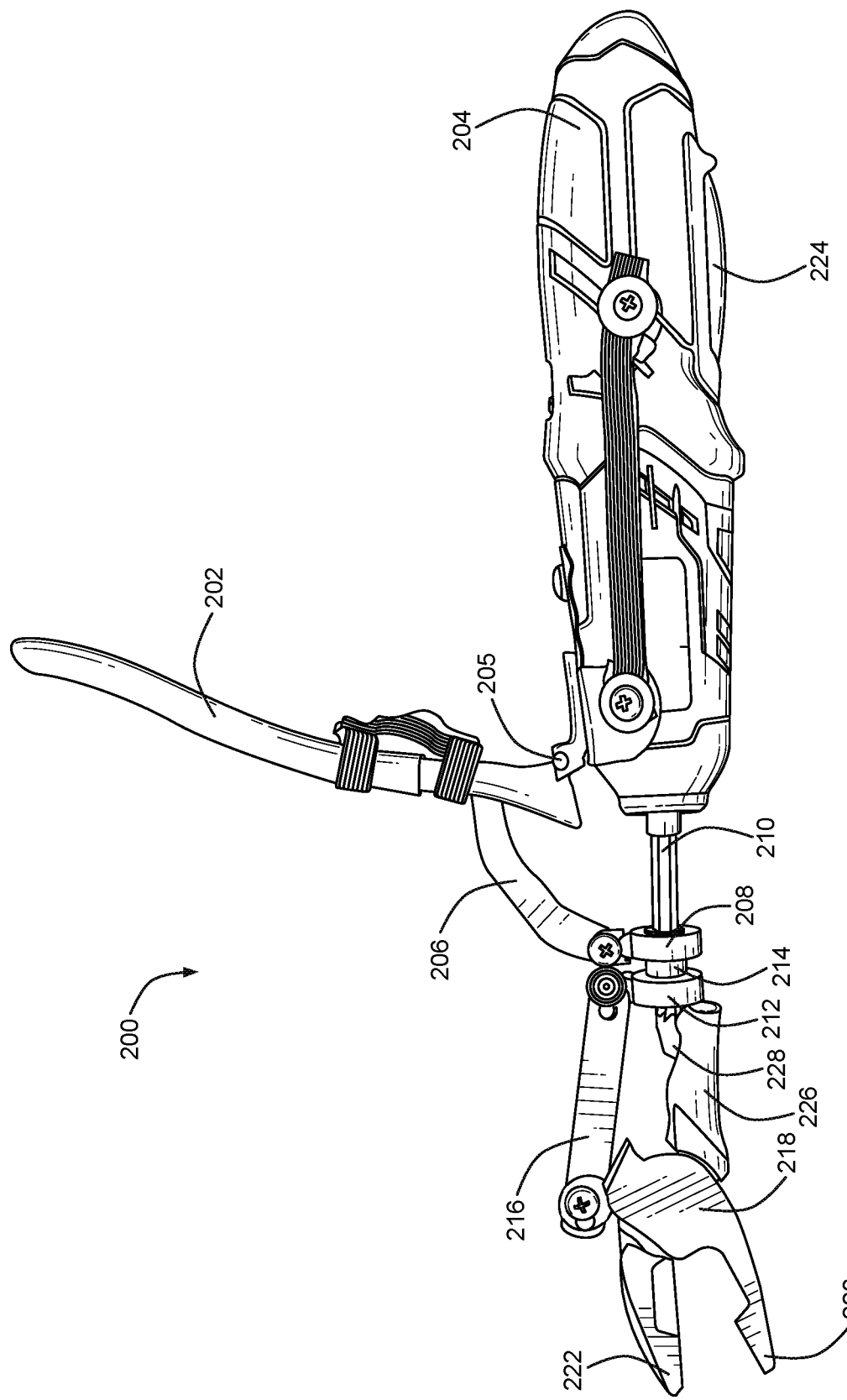
FIG. 9 illustrates a side elevation view of electric spinning pliers in an open position.

In one embodiment, as shown in FIGS. 8-9, the electronic spinning pliers 200 comprise a head-operating handle 202 pivotally coupled to a housing 204 via pivot pin 205. The head-operating handle 202 may also be pivotally coupled to a first support 206. The first support 206 may be coupled to a first bearing 208, which is slidably coupled to a rotatable shaft 210. The first bearing 208 may also be coupled to a second bearing 212 via a spacer 214 positioned therebetween. The second bearing 212 may also be slidably coupled to the rotatable shaft 210. Further, a second support 216 may be coupled to the second bearing 212 and pivotally coupled to a plier head 218.

Referring to FIG. 9, to open the plier head 218, a user may lift the head-operating handle 202, thereby sliding the first and second bearings 208, 212 longitudinally along the rotatable shaft 210 towards the plier head 218. As the second support 216 is pushed forward, a second arm 220 of the plier head 218 pivots downward while the first arm 222 remains stationary, thereby opening the plier head 218. In some embodiments, the first and second arms 220, 222 may both pivot so as to open the plier head 218. Once the wires are gripped between the first and second arms 220, 222, a user activates rotation of the head by pressing the power button 224. Pressing the power button 224 actuates an internal motor that rotates rotatable shaft 210. Due to bearing 208, the rotatable shaft rotates therein without causing rotational movement to the first support 206, which allows the handle 202 to remain stationary. However, the rotatable shaft 210 is directly coupled to the plier head 218 via head coupler 226 and weld 228. Accordingly, as the rotatable shaft 210 rotates, the head likewise rotates. The bearing 212 facilitates sliding on the rotatable shaft 210 while not inhibiting rotation. Accordingly, second support 216 rotates along with first and second arms 220, 222. Because the bearings 208, 212 are coupled via the spacer 214, when a user actuates the handle 202, both bearings slide back and forth on the rotatable shaft 210, thereby closing and opening the first and second arms 220, 222, respectively. While the electronic spinning pliers 200 show an external plier head actuating mechanism (e.g., bearings 208, 212, arms 206, 216), it will be appreciated that a similar mechanism may be concealed within the housing of previously mentioned embodiments.

Therefore, electric spinning pliers may comprise a plier head capable of gripping, the plier head opened and closed using a handle or electric actuator (e.g., button and motor), with the plier head electrically rotatable without rotating the housing or handle. The user is then able to grip and twist with pliers without rotating or torqueing with the hand or wrist. It will be appreciated that components of the various illustrated embodiments may be combined and that an embodiment is not limited to a single illustration. It will further be appreciated that any mechanically operated components on the electric spinning pliers 100, 200 may also be electrically operated.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. Electric spinning pliers, comprising:
    a housing;
    a plier head coupled to a rotatable shaft, the rotatable shaft extending longitudinally through the housing;
    an electric motor within the housing configured to rotate the rotatable shaft;
    a head-operating handle configured to open the plier head, the head-operating handle remaining stationary when the plier head rotates on the rotatable shaft; and
    at least one bearing coupled to the rotatable shaft, the at least one bearing coupling the head-operating handle to the plier head.

2. The electric spinning pliers of claim 1, further comprising:
    a first support arm coupled to the head-operating handle on a first side and a first bearing on a second side, the first bearing slidable on the rotatable shaft;
    a second bearing coupled to the first bearing via a spacer, the second bearing slidable on the rotatable shaft; and
    a head coupler that couples the plier head to the rotatable shaft, the head coupler ensuring rotation of the plier head when the rotatable shaft rotates, while the first bearing ensures that the first support arm does not rotate.

3. The electric spinning pliers of claim 1, further comprising a wire sleeve stripper for stripping an outer sleeve on a group of wires, an iris door for stripping individual wires from the group of wires, and one or more controls.

4. The electric spinning pliers of claim 3, wherein the iris door comprises leaves to strip a wire.

5. The electric spinning pliers of claim 3, where the iris door comprises an actuating arm.

6. The electric spinning pliers of claim 3, wherein the one or more controls comprises a forward/reverse button and a trigger button.

7. The electric spinning pliers of claim 1, wherein the plier head comprises a first arm pivotally coupled to a second arm.

8. The electric spinning pliers of claim 1, wherein the plier head comprises a wire receiving aperture.

9. The electric spinning pliers of claim 8, wherein the wire receiving aperture comprises an ovular shape to receive a group of wires and a wire nut.

10. The electric spinning pliers of claim 1, wherein the plier head comprises pipe grips and a cutter.

11. The electric spinning pliers of claim 1, wherein the plier head comprises a bit aperture.

12. The electric spinning pliers of claim 11, wherein the bit aperture comprises a hex bit aperture to receive hex bits.

13. The electric spinning pliers of claim 1, further comprising an indicator light.

14. Electric spinning pliers, comprising:
    a housing, comprising:
        a wire sleeve stripper for stripping an outer sleeve on a group of wires,
        an iris door for stripping individual wires from the group of wires,
        a forward/reverse button, and
        a trigger button;
    a rotatable shaft extending longitudinally through the housing;
    a motor within the housing configured to rotate the rotatable shaft, the motor actuatable via the trigger button;
    a plier head coupled to the rotatable shaft, the plier head comprising:
        a first arm pivotally coupled to a second arm,
        a wire receiving aperture at a front portion of the plier head, and
        a bit aperture;
    a head-operating handle that remains stationary while the plier head rotates.

15. The electric spinning pliers of claim 14, wherein the plier head further comprises pipe grips and a cutter.

16. The electric spinning pliers of claim 14, wherein the bit aperture comprises a hex bit aperture to receive hex bits.

17. The electric spinning pliers of claim 14, wherein the head-operating handle comprises a grip material.

18. The electric spinning pliers of claim 14, further comprising an indicator light.

19. A method of using electric spinning pliers comprising:
inserting a group of individual wires with an outer sleeve into a wire sleeve stripper;
cutting the outer sleeve with the wire sleeve stripper;
inserting each wire of the group of wires into an iris door to remove each wire sleeve;
combining and placing the group of individual wires into a wire receiving aperture on a plier head;
rotating the plier head by pressing a trigger button and twisting the group of individual wires together.

\* \* \* \* \*